(12) United States Patent
Whitehouse et al.

(10) Patent No.: US 6,268,407 B1
(45) Date of Patent: Jul. 31, 2001

(54) COMPOSITIONS AND ARTICLES OF MANUFACTURE

(75) Inventors: Robert S. Whitehouse, Lexington, MA (US); Michel Longuet, Neuily (FR); Theo Al, Koudekerk aan den Rijn (NL); Michael Smith, Kuala Lumpur (MY)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 09/288,888

(22) Filed: Apr. 9, 1999

Related U.S. Application Data

(63) Continuation of application No. 08/678,014, filed on Jul. 10, 1996, now abandoned.

(51) Int. Cl.$^7$ .................................................. C08K 9/00
(52) U.S. Cl. .................. 523/205; 523/209; 523/215; 523/216; 524/220; 524/495; 524/496
(58) Field of Search ................................... 524/220, 495, 524/496; 523/205, 209, 215, 216

(56) References Cited

U.S. PATENT DOCUMENTS

| | | | |
|---|---|---|---|
| 2,065,371 | 12/1936 | Glaxner | 134/60 |
| 2,457,962 | 1/1949 | Whaley | 260/766 |
| 2,511,901 | 6/1950 | Bunn | 18/48 |
| 2,635,057 | 4/1953 | Jordan | 106/307 |
| 2,639,225 | 5/1953 | Venuto | 23/314 |
| 2,850,403 | 9/1958 | Day | 106/307 |
| 2,908,586 | 10/1959 | Braendle et al. | 106/307 |
| 2,922,773 | 1/1960 | Coler et al. | 260/32.6 |
| 3,011,902 | 12/1961 | Jordan | 106/307 |
| 3,014,810 | 12/1961 | Dybalski et al. | 106/308 |
| 3,361,702 | 1/1968 | Wartman et al. | 260/33.2 |
| 3,464,949 | 9/1969 | Wartman et al. | 260/32.6 |
| 3,528,785 | 9/1970 | Dingus . | |
| 3,559,735 | 2/1971 | Corrin | 166/275 |
| 3,565,658 | 2/1971 | Frazier et al. | 106/307 |
| 3,645,765 | 2/1972 | Frazier et al. | 106/307 |
| 3,691,071 | 9/1972 | Corrin | 252/8.55 D |
| 3,844,809 | 10/1974 | Murray . | |
| 4,013,622 | 3/1977 | DeJuneas et al. . | |
| 4,102,967 | 7/1978 | Vanderveen et al. . | |
| 4,230,501 | 10/1980 | Howard et al. . | |
| 4,277,288 | 7/1981 | Lawrence et al. . | |
| 4,305,849 | 12/1981 | Kawasaki et al. . | |
| 4,397,652 | 8/1983 | Neumann . | |
| 4,440,807 | 4/1984 | Gunnell . | |
| 4,444,948 | 4/1984 | Hochstrasser et al. | 525/61 |
| 4,569,834 | 2/1986 | West et al. . | |
| 4,612,139 | 9/1986 | Kawasaki et al. . | |
| 4,812,505 | 3/1989 | Topcik . | |
| 4,837,252 | 6/1989 | Seguin et al. . | |
| 5,168,012 | 12/1992 | Watson et al. . | |
| 5,276,082 | 1/1994 | Forry et al. | 525/209 |
| 5,397,087 | 3/1995 | Hitchcock et al. | 521/76 |
| 5,871,706 | 2/1999 | Whitehouse | 423/449.2 |
| 5,872,177 | 2/1999 | Whitehouse | 524/495 |

FOREIGN PATENT DOCUMENTS

| | | |
|---|---|---|
| 0709008 | 5/1965 | (CA) . |
| 2723488 | 11/1984 | (DE) . |
| 975847 | 11/1964 | (GB) . |
| 2029421 | 3/1980 | (GB) . |
| 51-144430 | 12/1976 | (JP) . |
| 52-69950 | 6/1977 | (JP) . |
| 52-130481 | 11/1977 | (JP) . |
| 55-165934 | 12/1980 | (JP) . |
| 58-19811 | 2/1983 | (JP) . |
| 59-100147 | 6/1984 | (JP) . |
| 61-118499 | 6/1986 | (JP) . |
| 62-104936 | 1/1987 | (JP) . |
| 1201369 | 8/1989 | (JP) . |
| 4-164901 | 6/1992 | (JP) . |
| 937492 | 6/1982 | (RU) . |
| WO 93/10195 | 5/1993 | (WO) . |
| WO 94/05725 | 3/1994 | (WO) . |
| WO 96/10601 | 4/1996 | (WO) . |
| WO 96/21698 | 7/1996 | (WO) . |

*Primary Examiner*—Peter D. Mulcahy

(57) ABSTRACT

A composition comprising a filler material, a chemical compound and a polymer. A preferred filler material comprises carbon black and preferred polymers include ethylene-containing polymers such as ethylene-propylene copolymer or ethylene-propylene terpolymers. The present invention also includes articles of manufacture incorporating the polymer compositions.

23 Claims, No Drawings

COMPOSITIONS AND ARTICLES OF MANUFACTURE

This application is a continuation of Ser. No. 08/678,014 filed Jul. 10, 1996, now abandoned.

FIELD OF THE INVENTION

The present invention relates to a composition comprising a filler material, a chemical compound and a polymer. A preferred filler material comprises carbon black and preferred polymers include ethylene-containing polymers such as ethylene-propylene copolymer or ethylene-propylene terpolymers. The present invention also relates to articles of manufacture incorporating the compositions.

BACKGROUND OF THE INVENTION

Polymer compositions are utilized in a variety of applications, including so-called "industrial rubber applications". Industrial rubber applications include hoses, belts, electrical cable insulation, automotive and industrial weatherstripping, profiles, molded parts and the like. Many articles for industrial rubber applications are produced through extrusion techniques, i.e. the polymer composition is extruded through a die then cooled or chemically hardened.

Fillers are often utilized in polymer compositions to impart desirable characteristics such as reinforcement, pigmentation and/or conductivity to the polymer compositions. Carbon blacks have been widely utilized as fillers and reinforcing pigments in the compounding and preparation of polymer compositions. Carbon blacks are generally characterized on the basis of one or more of their properties including, but not limited to, their surface areas, surface chemistry, aggregate sizes, and particle sizes. The properties of carbon blacks are analytically determined by tests known to the art, including iodine number ($I_2$No.) and dibutyl phthalate adsorption (DBP).

The dispersion properties (dispersibility) of a filler are relevant to the use of fillers in polymer compositions. It is generally advantageous to have fillers which are easily dispersible in polymer compositions.

Many types of polymer compositions are cured using an UHF microwave curing process. UHF microwave curing is becoming increasingly important due to its high curing efficiency and other desirable attributes. As understood in the art, UHF microwave curing refers to a curing process utilizing ultra high frequency microwaves (from about 300 to 3000 megahertz (megacycles per second or "MHz")). Polymer compositions that are more receptive to UHF microwave curing have a faster heating rate and thus are advantageous for processing the material.

Generally, polymer compositions incorporating high surface area carbon blacks are more receptive to UHF microwave curing. However, high surface area carbon blacks are often difficult to disperse in polymer compositions. It would be advantageous to have a carbon black composition which is easily dispersible in polymer compositions and/or which imparts increased UHF receptivity to the polymer composition.

SUMMARY OF THE INVENTION

The present invention provides compositions and articles of manufacture which achieve the advantages set forth above as well as other advantages.

The present invention provides a composition comprising:

an ethylene containing polymer;

50 to 250 parts by weight a filler material, per 100 parts by weight ethylene containing polymer (50 to 250 phr); and 0.05 to 50 parts by weight of a chemical compound, per 100 parts by weight ethylene containing polymer (0.05 to 50 phr), the chemical compound having the structure A-B-[(C)$_y$]$_x$-D wherein:

A comprises one or more of the following: hydrogen, an alkyl group, an aryl group; or an alkyl aryl group;

B is a bridging group between A and C comprising one or more of the following: ether, a carboxylic acid, a 1,2-dicarboxylic acid derived from an anhydride, an amine, an amide, a sulfate, a sulphonate, a phosphate, a phosphate, or a carboxylic ester of a polyhydric alcohol containing 2 to 6 hydroxyl groups;

C comprises an ethylene oxide repeating unit;

D comprises one or more the following: hydrogen, an alkyl group, an alkali or an alkaline earth metal;

y is 0 to 200 and x=1, 2, 3, 4 or 5

The composition may further comprise: 0 to 200 parts by weight an oil, per 100 part by weight of ethylene containing polymer (0 to 200 phr).

The present invention also includes an article of manufacture produced utilizing the composition of the present invention. The article of manufacture may comprise an extruded article, including a profile, tube, tape or film; a hose; a belt; or a molded article.

In accordance with one aspect of the composition of the present invention, the composition is receptive to UHF microwave curing.

In accordance with another aspect of the composition of the present invention, the filler material may be easily dispersed in the composition during its preparation.

The articles of manufacture of the present invention are advantageous for similar reasons.

Further details and advantages of the present invention are set forth in the following more detailed description.

DETAILED DESCRIPTION OF THE INVENTION

According to the present invention, a composition comprises:

an ethylene containing polymer;

50 to 250 parts by weight a filler material, per 100 parts by weight ethylene containing polymer (50 to 250 phr); and 0.05 to 50 parts by weight a chemical compound, per 100 parts by weight ethylene containing polymer (0.05 to 50 phr) the chemical compound having the structure A-B-[(C)$_y$]$_x$-D wherein:

A comprises one or more of the following: hydrogen, an alkyl group, an aryl group; or an alkyl aryl group, preferably an alkyl group, more preferably an alkyl group with 8 to 65 carbon atoms;

B is a bridging group between A and C comprising one or more of the following: ether, a carboxylic acid, a 1,2-dicarboxylic acid derived from an anhydride, an amine, an amide, a sulfate, a sulphonate, a phosphate, a phosphate, or a carboxylic ester of a polyhydric alcohol containing 2 to 6 hydroxyl groups;

C comprises an ethylene oxide repeating unit;

D comprises one or more the following: hydrogen, an alkyl group, an alkali or an alkaline earth metal; preferably hydrogen or, if an alkyl group preferably methyl, or if an alkali or alkaline earth metal preferably sodium or potassium;

y is 0 to 200, preferably 5 to 40 and x=1, 2, 3, 4 or 5, preferably if B comprises an ether, a carboxylic acid, a sulphate or a sulphonate then x=1;

if B comprises an amine, amide or a phosphate then x=2;

if B comprises a 1,2-dicarboxylic acid then x=1 or 2;

if B comprises an ester of a polyhydric alcohol containing 2 to 6 hydroxyl groups x=1, 2, 3, 4 or 5.

The composition may further comprise: 0 to 200 parts by weight an oil, per 100 part by weight of ethylene containing polymer (0 to 200 phr).

Preferred chemical compounds comprise: fatty alcohol ethoxylates, fatty acid ethoxylates, fatty amine ethoxylates, fatty amide ethoxylates, glycerol and sorbitan ester ethoxylates.

Examples of ethylene containing polymers suitable for use in the composition of the present invention include, but are not limited to: homo, co or terpolymers and graft polymers of ethylene where the co-monomers are selected from butene, hexene, propene, octene, vinyl acetate, acrylic acid, methacrylic acid, esters of acrylic acid, esters of methacrylic acid, maleic anhydride, half ester of maleic anhydride, and carbon monoxide. Preferably the ethylene containing polymer comprises: an ethylene-propylene copolymer or an ethylene-propylene terpolymer. More preferably, the ethylene containing polymer comprises ethylene propylene diene monomer (EPDM).

Suitable filler materials for use in the composition of the present invention include, but are not limited to, carbonaceous filler materials such as carbon black and graphite, composites comprising carbon black and metal oxide (e.g. silica) and blends including such carbonaceous filler materials.

Suitable oils include, but are not limited to: aromatic oils, naphthenic oils, hydrogenated naphthenic oils, paraffinic oils and vegetable oils.

The composition of the present invention may include other conventional additives such as coagents, additional filler materials, processing additives, hydrocarbon oils, stabilizers, accelerators, antioxidants, curing agents, vinyl silane and the like.

In an embodiment of the present invention the composition is curable.

The compositions of the present invention may be produced by physically mixing the polymer, filler and chemical compound in any manner known to the art for combining polymers and particulate components. A preferred method for producing the compositions of the present invention is compounding using a batch or continuous mixer such as a Banbury mixer, Twin Screw extruder or Buss kneader. The compositions of the present invention may be cured in manners conventional in the art.

The compositions of the present invention may also be produced by pretreating the filler material with the chemical compound and then physically mixing the treated filler material and the polymer. As used herein, a treated filler material comprises a filler material and a chemical compound.

As set forth above, a suitable filler material for use in the present invention is a carbonaceous material. A preferred carbonaceous material is carbon black. The carbon black may be any carbon black such as a furnace carbon black, a thermal carbon black, an acetylene black, and a carbon black produced by a gasification process. While any carbon black may be utilized in the compositions of the present invention, preferably the carbon black component of the treated filler material has an iodine number ($I_2$No.) of 10–70 mg/g, preferably 10–40 mg/g, and a fluffy dibutyl phthalate absorption value (DBP) of 30–150 cc/100 g, preferably 80–130 cc/100 g.

A preferred treated filler material is a carbon black treated with 0.1 to 50%, by weight, preferably 0.1 to 20%, by weight, based on the weight of the treated filler material of a chemical compound, wherein the chemical compound has the structure A-B-[(C)$_y$]$_x$-D wherein:

A comprises: hydrogen, an alkyl group, an aryl group; an alkyl aryl group, preferably an alkyl group, more preferably an alkyl group with 8 to 65 carbon atoms; or mixtures thereof;

B is a bridging group between A and C comprising: ether, a carboxylic acid, a 1,2-dicarboxylic acid derived from an anhydride, an amine, an amide, a sulfate, a sulphonate, a phosphate, a phosphate, a carboxylic ester of a polyhydric alcohol containing 2 to 6 hydroxyl groups;

C comprises an ethylene oxide repeating unit;

D comprises hydrogen, an alkyl group, an alkali, an alkaline earth metal or mixtures thereof; preferably hydrogen or, if an alkyl group preferably methyl, or if an alkali or alkaline earth metal preferably sodium or potassium;

y is 0 to 200, preferably 5 to 40 and x=1, 2, 3, 4 or 5, preferably if B comprises an ether, a carboxylic acid, a sulphate or a sulphonate then x=1;

if B comprises an amine, amide or a phosphate then x=2;

if B comprises a 1,2-dicarboxylic acid then x=1 or 2;

if B comprises an ester of a polyhydric alcohol containing 2 to 6 hydroxyl groups x=1, 2, 3, 4 or 5.

The treated filler material may further comprise 0 to 50%, by weight an oil. Suitable oils include, but are not limited to, conventional pelletizing oil and aromatic oils, naphthenic oils, hydrogenated naphthenic oils, paraffinic oils, vegetable oils and/or mixtures thereof.

A treated filler material suitable for use in the compositions of the present invention may be produced in any manner known in the art, such as by physically blending the components, melt mixing the components or combining the components while pelletizing the filler. The treated filler material may be produced, in dry form, by a conventional pelletizing process. For example, treated filler material for use in the compositions of the present invention may be produced by contacting a filler, e.g. a fluffy carbon black, in a pin pelletizer with a dispersion containing a chemical compound to form wet pellets and then heating the wet pellets under controlled temperature and time parameters such that the volatiles are removed from the pellets without the chemical compound undergoing substantial decomposition.

Pin pelletizers which may be utilized to produce a treated filler material for use in compositions of the present invention are known in the art and include the pin pelletizer described in U.S. Pat. No. 3,528,785, the disclosure of which is hereby incorporated by reference. U.S. Pat. No. 3,528,785 also describes a conventional pelletizing process which may be utilized to produce a treated filler material for use in the compositions of the present invention.

The present invention also includes an article of manufacture produced utilizing the composition of the present invention. The article of manufacture may comprise an extruded article, such as a profile, tube, tape or film. The article of manufacture may also comprise a hose; a belt; or a molded article. The articles of manufacture of the present invention may be produced using conventional techniques utilized by those of ordinary skill in the art.

The effectiveness and advantages of various aspects and embodiments of the present invention will be further illustrated by the following examples wherein the following testing procedures were utilized.

The following testing procedures were utilized in the determination and evaluation of the analytical properties of the carbon blacks utilized in the following examples. The DBP (dibutyl phthalate adsorption value) of the carbon blacks utilized in the examples, expressed as cubic centimeters DBP per 100 grams carbon black (cc/100 g), was determined according to the procedure set forth in ASTM D2414. The Iodine number ($I_2$No.) of the carbon blacks utilized in the examples, expressed as milligrams per gram (mg/g), was determined according to ASTM test procedure D1510.

The polymer compositions, described in the following examples were evaluated for heating rate and heating time to reach 180° C., utilizing the following test procedures. A 6 mm (millimeter) in diameter by 40 mm long test piece of the polymer composition was exposed to a 60 Watt microwave source. Temperature change in the test piece under exposure was measured utilizing a temperature probe, and exposure time was measured utilizing a stopwatch. The exposure time for the test piece to reach 180° C. was measured and the heating rate in ° C. per second was calculated from the exposure time.

As utilized in the description of the chemical compounds utilized in the Examples, HLB value refers to hydrophile-lipophile balance value which may be determined by the method described in *Non-Ionic Surfactants Volume 23*, edited by Martin Schick (Marcel Dekker Inc. (New York) 1987; ISBN 0-8247-7530-9), page 440. *Non-Ionic Surfactants Volume 23* provides equations which relate the structure of the surfactant molecule to HLB value. HLB value is also discussed in the following journal articles: Griffin W. C., *J. Soc. Cosmetic Chemist*, Vol. 1, page 311 et seq. (1949) and Vol. 5, page 249 et seq. (1954). From data relating to the weight percentage of ethylene oxide in the molecule, saponification number of the ester linkage and acid value of the "fatty" acid, HLB value may be directly calculated from one of the following equations:

for polyhydric fatty acid esters:

HLB=20 (1-S/A) where S=saponification number of the ester and A=acid number of the acid; and for ethoxylated polyhydric alcohols:

HLB=(E+P)/5, where E=weight of percent ethylene oxide and P=weight pigment of polyhydric alcohol.

EXAMPLE 1

Example 1 illustrates the advantages of the compositions of the present invention with respect to UHF Microwave receptivity.

Fifteen compositions, 1–15, were produced utilizing the basic formulation set forth in Table 1.

TABLE 1

Composition Formulation

| Ingredient | Parts by Weight |
|---|---|
| VISTALON 7500 EPDM | 100 |
| Zinc oxide | 7.5 |
| Sunpar 2280 oil | 75 |
| Sulphur | 1.0 |
| Carbon black, CB-1 | 115 |
| Kezandol GR | 5 |
| Chemical Compound Additive | Polymer Comp. 1 (Control) = 0 parts by weight<br>Polymer Comp. 2–15 = 3 parts by weight total |

VISTALON® 7500 is an EPDM manufactured and sold by EXXON Corporation, Wilmington, Del.

Sunpar 2280 oil is an oil manufactured and sold by Sun Oil Company

Kezandol GR is coated calcium oxide (a moisture scavenger) manufactured and sold by Kettlitz, GmbH.

Carbon Black CB-1 is a carbon black having an $I_2$No. of 43 mg/g and a DBP of 125 cc/100 g. Composition 1 is a control composition produced without a chemical compound additive. Composition 2 is also a control composition produced with a chemical compound falling outside the scope of the present invention. Compositions 3–15 are examples of compositions of the present invention.

The chemical compound additive utilized in compositions 2–15 are set forth below in Table 2.

| Comp-osition | Chemical Compound Additive/Amount Utilized | Description |
|---|---|---|
| 1 | None | N.A. |
| 2 | Sunpar 2280 oil = 3 pbw | Sunpar 2280 oil is an oil manufactured and sold by Sun Oil Company |
| 3 | A1 = 3 pbw | coconut diethanolamide HLB 10.2 |
| 4 | A2 = 3 pbw | Sorbitan monolaurate +20 moles ethylene oxide HLB 16.7 |
| 5 | A3 = 3 pbw | Sorbitan mono-oleate + 20 moles ethylene oxide HLB 15.0 |
| 6 | A4 = 3 pbw | Glycerol ricinoleate + 30 moles ethylene oxide HLB 12 |
| 7 | A5 = 3 pbw | steric acid + 20 moles ethylene oxide HLB 15 |
| 8 | A6 = 3 pbw | cetyl alcohol + 20 moles ethylene oxide HLB 15.7 |
| 9 | A7 = 3 pbw | octyl phenol + 10 moles ethylene oxide HLB 13.6 |
| 10 | A8 = 3 pbw | PEG 40 hydrogenated castor oil HLB 13 |
| 11 | A1 = 1.5 pbw<br>A3 = 1.5 pbw | See Above<br>See Above |
| 12 | A1 = 1.5 pbw<br>A9 = 1.5 pbw | See Above<br>See Above |
| 13 | A1 = 1.5 pbw<br>A4 = 1.5 pbw | See Above<br>See Above |
| 14 | A1 = 1.5 pbw | See Above |

-continued

| Composition | Chemical Compound Additive/Amount Utilized | Description |
|---|---|---|
|  | A8 = 1.5 pbw | See Above |
| 15 | A1 = 1.5 pbw | See Above |
|  | A10 = 1.5 pbw | tallow amine + 15 moles ethylene oxide HLB 19.2 | pbw = parts by weight (see Table 1)

The composition ingredients set forth in Tables 1 and 2 above were compounded together using a Banbury mixer with the cooling water set at 40° C., the rotor speed 50 rmp and the ram at 1 bar pressure. The mixing cycle was 4 minutes after which the compound was transferred to a rotating cold two roll mill (cooling water temperature 40° C.).

Once a continuous band of compound had been formed on one of the rotating rolls, curing agents MBT (mercaptobenzothiazole) and TMTD (tetramethylthiuram disulfide, both 75% active, were both added at an amount of 1.07 part by weight based on the above composition. After allowing the curing agents to thoroughly mix for a period of 8 minutes the compound was removed from the mill in the form of a sheet and allowed to cool.

The sheet was cut into small, approximately 50 mm×50 mm, pieces and fed into a single screw extruder operating with a screw speed of 50 rpm and at heated barrel at 80° C. A die was positioned at the end of the extruder barrel to provide a strand 5 mm in diameter. Portions of the extruder strand, 6 mm diameter by 40 mm long, were exposed to a 60 W microwave source and the rate of temperature change recorded pursuant to the procedures described in detail above. The results are presented in Table 3 below.

TABLE 3

| Composition | Heating rate (° C./sec.) | Time to reach 180° C. (sec.) |
|---|---|---|
| 1 | 7.8 | 28 |
| 2 | 7.5 | 28 |
| 3 | 8.1 | 23 |
| 4 | 10.8 | 18 |
| 5 | 10.4 | 17 |
| 6 | 10.7 | 18 |
| 7 | 10.7 | 17 |
| 8 | 10.6 | 17 |
| 9 | 10.3 | 18 |
| 10 | 10.0 | 18 |
| 11 | 10.3 | 19 |
| 12 | 10.4 | 18 |
| 13 | 9.5 | 19 |
| 14 | 10.4 | 19 |
| 15 | 11 | 18 |

These results illustrate that the compositions of the present invention 3–15, had faster heating rates in comparison to control compositions 1 and 2. Thus, the compositions of the present invention 3–15 have improved UHF Microwave receptivity in comparison to control compositions 1 and 2.

The compositions described in the above Tables show enhancement in UHF receptivity of the compounds. This allows for faster heating rates which translate to shorter curing cycles. The reduction in cure time can impart significant savings in manufacturing efficiency.

EXAMPLE 2

This example also illustrates the advantages of the compositions of the present invention with respect to UHF Microwave receptivity.

Twenty-nine compositions, 16–44, were produced utilizing the basic formulation set forth in Table 4 below.

TABLE 4

Composition Formulation

| Ingredient | Parts by Weight |
|---|---|
| VISTALON 7500 EPDM | 100 |
| Zinc oxide | 7.5 |
| Sunpar 2280 oil | 75 |
| Sulphur | 1.0 |
| Carbon black, CB-2 | 160 |
| Kezandol GR | 5 |
| Chemical Compound Additive | Polymer Comp. 16 (Control) = 0 parts by weight Polymer Comp. 17–44 = 5 parts by weight total |

VISTALON® 7500 is an EPDM manufactured and sold by EXXON Corporation, Wilmington, Del.

Sunpar 2280 oil is an oil manufactured and sold by Sun Oil Company

Kezandol GR is coated calcium oxide (a moisture scavenger) manufactured and sold by Kettlitz, GmBH.

Carbon Black CB-2 is a carbon black having an $I_2$No. of 18 mg/g and a DBP of 123 cc/100 g. Polymer composition 16 is a control composition produced without a chemical compound additive. Polymer composition 17 is also a control composition produced with a chemical compound falling outside the scope of the present invention. Polymer compositions 18–44 are examples of compositions of the present invention.

The chemical compound additives utilized in compositions 17–44 are set forth below in Table 5.

TABLE 5

Chemical Compound Additives

| Composition | Chemical Compound Additive/Amount Utilized | Description |
|---|---|---|
| 16 | None (control) | N.A. |
| 17 | Sunpar 2280 oil = 5 pbw | Sunpar 2280 oil is an oil manufactured and sold by Sun Oil Company |
| 18 | A11 = 5 pbw | cetyl alcohol + 2 moles ethylene oxide HLB 5.3 |
| 19 | A12 = 5 pbw | nonyl phenol + 10 moles ethylene oxide HLB 13.2 |
| 20 | A13 = 5 pbw | nonyl phenol + 4 moles ethylen oxide HLB 8.9 |
| 21 | A6 = 5 pbw | cetyl alcohol + 20 moles ethylene oxide HLB 15.7 |
| 22 | A14 = 5 pbw | lauryl alcohol + 2 moles ethylen oxide HLB 7.1 |
| 23 | A15 = 5 pbw | lauryl alcohol + 23 moles ethylene oxide HLB 16.9 |
| 24 | A16 = 5 pbw | oleyl alcohol + 21 moles ethylene oxide HLB 15.3 |
| 25 | A17 = 5 pbw | stearyl alcohol + 20 moles ethylene oxide HLB 15.3 |
| 26 | A5 = 5 pbw | stearic acid + 20 moles ethylene oxide HLB 15 |
| 27 | A4 = 5 pbw | glycerol ricinoleate + |

TABLE 5-continued

Chemical Compound Additives

| Composition | Chemical Compound Additive/Amount Utilized | Description |
|---|---|---|
| | | 30 moles ethylen oxide HLB 12 |
| 28 | A12 = 5 pbw | See Above |
| 29 | A21 = 5 pbw | stearic acid + 8 moles ethylene oxide HLB 11.1 |
| 30 | A22 = 5 pbw | stearic acid + 100 moles ethylene oxide HLB 18.8 | pbw = parts by weight (see Table 4)

TABLE 5

Chemical Compound Additives (continued)

| Composition | Chemical Compound Additive/Amount Utilized | Description |
|---|---|---|
| 31 | 23 = 5 pbw | glycerol hydroxystearate + 25 moles ethylene oxide HLB 11 |
| 32 | A2 = 5 pbw | sorbitan monolaurate + 20 moles ethylene oxide HLB 16.7 |
| 33 | A3 = 5 pbw | sorbitan mono-oleate + 20 moles ethylene oxide HLB 15.0 |
| 34 | A24 = 5 pbw | sorbitan trioleate + 20 moles ethylene oxide HLB 11.0 |
| 35 | A25 = 5 pbw | sorbitan monolaurate HLB 8.6 |
| 36 | A26 = 5 pbw | sorbitan mono-oleate HLB 4.3 |
| 37 | A27 = 5 pbw | sorbitan trioleate HLB 1.8 |
| 38 | A1 = 5 pbw | coconut diethanolamide HLB 10.2 |
| 39 | A6 = 5 pbw | cetyl alcohol + 20 moles ethylene oxide HLB 15.7 |
| 40 | A5 = 5 pbw | Stearic acid + 20 moles ethylene oxide HLB 15 |
| 41 | A28 = 5 pbw | glycerol hydroxy stearate + 25 moles ethylene oxide HLB 11 |
| 42 | A11 = 5 pbw | cetyl alcohol + 2 moles ethylene oxide |
| 43 | A8 = 5 pbw | PEG 40 hydrogenated castor oil octyl phenol + 10 moles ethylene oxide HLB 13.6 |
| 44 | A7 = 5 pbw | tallow amine + 11 moles ethylene oxide HLB 16.1 |
| 45 | A29 = 5 pbw | | pbw = parts by weight (see Table 4)

The composition ingredients set forth in Tables 4 and 5 above were compounded together using a Banbury mixer with the cooling water set at 40° C., the rotor speed 50 rpm and the ram at 1 bar pressure. The mixing cycle was 4 minutes after which the compound was transferred to a rotating cold two roll mill (cooling water temperature 40° C.).

Once a continuous band of compound had been formed on one of the rotating rolls, curing agents MBT (mercaptobenzothiazole) and TMTD (tetramethylthiuram disulfide), both 75% active, were both added at an amount of 1.07 part by weight based on the above composition. After allowing the curing agents to thoroughly mix for a period of 8 minutes the compound was removed from the mill in the form of a sheet and allowed to cool.

The sheet was cut into small, approximately 50 mm×50 mm, pieces and fed into a single screw extruder operating with a screw speed of 50 rpm and at heated barrel at 80° C. A die was positioned at the end of the extruder barrel to provide a strand 5 mm in diameter. Portions of the extruder strand, 6 mm diameter by 40 mm long, were exposed to a 60 W microwave source and the rate of temperature change recorded pursuant to the procedures described in detail above. The results are presented in Table 6 below.

TABLE 6

| Composition | Heating rate (° C./sec.) | Time to reach 180° C. (sec.) |
|---|---|---|
| 16 | 1.4 | 118 |
| 17 | 1.1 | 119 |
| 18 | 3.0 | 47 |
| 19 | 3.0 | 44 |
| 20 | 1.7 | 73 |
| 21 | 3.6 | 38 |
| 22 | 2.2 | 53 |
| 23 | 3.4 | 36 |
| 24 | 3.7 | 35 |
| 25 | 3.5 | 36 |
| 26 | 3.3 | 40 |
| 27 | 3.5 | 39 |
| 28 | 3.1 | 41 |
| 29 | 3.4 | 38 |
| 30 | 2.2 | 67 |
| 31 | 3.3 | 38 |
| 32 | 3.0 | 43 |
| 33 | 3.2 | 41 |
| 34 | 2.8 | 46 |
| 35 | 1.9 | 64 |
| 36 | 1.7 | 65 |
| 37 | 1.6 | 69 |
| 38 | 2.1 | 60 |
| 39 | 3.6 | 38 |
| 40 | 3.3 | 40 |
| 41 | 3.3 | 38 |
| 42 | 3.0 | 44 |
| 43 | 3.0 | 44 |
| 44 | 2.7 | 47 |
| 45 | 3.2 | 43 |

These results illustrate that the compositions of the present invention 18–45, had faster heating comparison to control compositions 16 and 17. Thus, the compositions of the present invention 18–45 have improved UHF Microwave receptivity in comparison to control compositions 16 and 17.

The compositions described in the above tables show enhancement in UHF receptivity of the compounds. This allows for faster heating rates which translate to shorter curing cycles. The reduction in cure time can impart significant savings in manufacturing efficiency.

EXAMPLE 3

This example illustrates the production of compositions of the present invention wherein carbon black is pretreated with the chemical compound additive to form a treated filler material which is combined with a polymer to produce a composition of the present invention. This example also further illustrates the advantages of the compositions of the present invention.

Carbon black CB-3, having an $I_2$No. of 22 mg/g and a DBP of 95 cc/100 g was combined with two different amounts of chemical compound additive A3 (sorbitan mono-oleate+20 moles ethylene oxide, HLB 15.0) to produce an A3 treated carbon black composition comprising 0.7%, by weight A3, and to produce an A3 treated carbon black composition comprising 1.5%, by weight A3. The treated carbon black compositions were produced by combining the CB-3 carbon black, the chemical compound additive (A3) and water in a pin pelletizer of the type described in U.S. Pat. No. 3,528,785 to produce wet pellets. The wet pellets were dried in a rotating drum dryer until the moisture content of the pellets was below 0.3%, by weight to produce.

A control composition, 46, containing untreated CB-3 carbon black, as a carbon black component, and two compositions of the present invention 47 and 48, containing the treated carbon black were produced utilizing the formulation set forth in Table 7. Composition 47 incorporated the A3 treated carbon black composition comprising 0.7%, by weight A3, as a carbon black component, and Composition 48 incorporated the A3 treated carbon black composition comprising 1.5%, by weight A3, as a carbon black component.

TABLE 7

Composition Formulation

| Ingredient | Parts by Weight |
| --- | --- |
| VISTALON 7500 EPDM | 100 |
| Zinc oxide | 7.5 |
| Sunpar 2280 oil | 80 |
| Sulphur | 1.0 |
| Kezandol GR | 5 |
| Carbon Black Component | 175 |

VISTALON® 7500 is an EPDM manufactured and sold by EXXON Corporation, Wilmington, Del.

Sunpar 2280 oil is an oil manufactured and sold by Sun Oil Company

Kezandol GR is coated calcium oxide (a moisture scavenger) manufactured and sold by Kettlitz, GmBH.

The composition ingredients set forth in Table 7 above were compounded together using a Banbury mixer with the cooling water set at 40° C., the rotor speed 50 rpm and the ram at 1 bar pressure. The mixing cycle was 4 minutes after which the compound was transferred to a rotating cold two roll mill (cooling water temperature 40° C.)

Once a continuous band of compound had been formed on one of the rotating rolls, curing agents MBT (mercaptobenzothiazole) and TMTD (tetramethylthiuram disulfide), both 75% active, were both added at an amount of 1.07 part by weight based on the above composition. After allowing the curing agents to thoroughly mix for a period of 8 minutes the compound was removed from the mill in the form of a sheet and allowed to cool.

The sheet was cut into small, approximately 50 mm×50 mm, pieces and fed into a single screw extruder operating with a screw speed of 50 rpm and at heated barrel at 80° C. A die was positioned at the end of the extruder barrel to provide a strand 5 mm in diameter. Portions of the extruder strand, 6 mm diameter by 40 mm long, were exposed to a 60 W microwave source and the rate of temperature change recorded pursuant to the procedures described in detail above. The results are presented in Table 8 below.

TABLE 8

| Composition | Heating rate (° C./sec.) | Time to reach 180° C. (sec.) |
| --- | --- | --- |
| 46 | 2.8 | 63 |
| 47 | 5.0 | 34 |
| 48 | 5.2 | 35 |

These results illustrate that the compositions of the present invention 47 and 48, had faster heating rates in comparison to control composition 46. Thus, the compositions of the present invention 47 and 48 have improved UHF Microwave receptivity in comparison to control composition 46. Thus, these results illustrate that the advantages of the compositions of the present invention may be achieved when the chemical compound additive is precombined with the carbon black.

It should be clearly understood that the forms of the present invention herein described are illustrative only and are not intended to limit the scope of the invention.

What is claimed is:

1. A composition comprising in combination:

an ethylene containing polymer; and 50 to 250 parts by weight a pretreated carbonaceous filler material, per 100 parts by weight ethylene containing polymer (50 to 250 phr), said carbonaceous filler material being selected from carbon black, graphite, composites comprising carbon black and metal oxides and blends including such carbonaceous filler materials, and having been pretreated with 0.05 to 50 parts by weight a chemical compound per 100 parts by weight ethylene containing polymer (0.05 to 50 phr) having the structure $A\text{-}B\text{-}[(C)_y]_x\text{-}D$ wherein:

A comprises one or more of the following: hydrogen, an alkyl group, an aryl group; or an alkyl aryl group;

B is a bridging group between A and C comprising one or more of the following: ether, a carboxylic acid, a 1,2-dicarboxylic acid derived from an anhydride, an amine, an amide, a sulfate, a sulphonate, a phosphate, or a carboxylic ester of a polyhydric alcohol containing 2 to 6 hydroxyl groups;

C comprises an ethylene oxide repeating unit;

D comprises one or more of the following: hydrogen, an alkyl group, an alkali or an alkaline earth metal;

y is 0 to 200 and x=1, 2, 3, 4, or 5.

2. The composition of claim 1 wherein the ethylene containing polymer comprises an ethylene-propylene copolymer or an ethylene-propylene terpolymer.

3. The composition of claim 1 wherein the ethylene containing polymer is ethylene propylene diene monomer (EPDM).

4. The composition of claim 1 wherein the filler material comprises: carbon black, or graphite.

5. The composition of claim 1 wherein the chemical compound comprises: a fatty alcohol ethoxylate, a fatty acid ethoxylate, a fatty amine ethoxylate, a fatty amide ethoxylate, a glycerol or a sorbitan ester ethoxylate.

6. The composition of claim 1 further comprising: a coagent, a processing additive, a hydrocarbon oil, a stabilizer, an accelerator, an antioxidant, vinyl silane, a curing agent or mixtures thereof.

7. An article of manufacture formed from the composition of claim 1.

8. An article of manufacture formed from composition of claim 3.

9. The article of manufacture of claim 7 wherein the article comprises a hose.

10. The article of manufacture of claim 7 wherein the article comprises an extruded article comprising: a profile, a tube, a tape or a film.

11. The article of manufacture of claim 7 wherein the article comprises a molded article.

12. A composition comprising:
  an ethylene containing polymer;
  50 to 250 parts by weight carbon black per 100 parts by weight ethylene containing polymer (50 to 250 phr); and
  0.05 to 50 parts by weight a chemical compound per 100 parts by weight ethylene containing polymer (0.05 to 50 phr), said chemical compound comprising the structure A-B-[(C)$_y$]$_x$-D wherein:
    A comprises one or more of the following: hydrogen, an alkyl group, an aryl group; or an alkyl aryl group;
    B is a bridging group between A and C comprising one or more of the following: ether, a carboxylic acid, a 1,2-dicarboxylic acid derived from an anhydride, an amine, an amide, a sulfate, a sulphonate, a phosphate, or a carboxylic ester of a polyhydric alcohol containing 2 to 6 hydroxyl groups;
    C comprises an ethylene oxide repeating unit;
    D comprises one or more of the following: hydrogen, an alkyl group, an alkali, or an alkaline earth metal;
    y is 0 to 200; and
    x=1, 2, 3, 4, or 5.

13. The composition of claim 12, wherein the ethylene containing polymer comprises an ethylene-propylene copolymer or an ethylene-propylene terpolymer.

14. The composition of claim 13, wherein the ethylene containing polymer is ethylene propylene diene monomer (EPDM).

15. The composition of claim 12, wherein the chemical compound comprises: a fatty alcohol ethoxylate, a fatty acid ethoxylate, a fatty amine ethoxylate, a fatty amide ethoxylate, a glycerol or a sorbitan ester ethoxylate.

16. The composition of claim 12, wherein the carbon black has an I$_2$No. of 10–70 mg/g and a DBP of 30–150 cc/100 g.

17. The composition of claim 12, further comprising: a coagent, a processing additive, a hydrocarbon oil, a stabilizer, an accelerator, an antioxidant, vinyl silane, a curing agent, or mixtures thereof.

18. A composition comprising in combination an ethylene containing polymer and a pretreated filler, said pretreated filler comprising:
  50 to 250 parts by weight a carbon black filler material per 100 parts by weight ethylene containing polymer (50 to 250 phr), said carbon black having an I$_2$No. of 10–70 mg/g and a DBP of 30–150 cc/100 g; and
  0.05 to 50 parts by weight a chemical compound per 100 parts by weight ethylene containing polymer (0.05 to 50 phr), said chemical compound comprising the structure A-B-[(C)$_y$]$_x$-D wherein:
    A comprises one or more of the following: hydrogen, an alkyl group, an aryl group; or an alkyl aryl group;
    B is a bridging group between A and C comprising one or more of the following: ether, a carboxylic acid, a 1,2-dicarboxylic acid derived from an anhydride, an amine, an amide, a sulfate, a sulphonate, or a carboxylic ester of a polyhydric alcohol containing 2 to 6 hydroxyl groups;
    C comprises an ethylene oxide repeating unit;
    D comprises one or more of the following: hydrogen, an alkyl group, an alkali, or an alkaline earth metal;
    y is 0 to 200; and
    x=1, 2, 3, 4, or 5, wherein said carbon black has been pretreated with said chemical compound prior to being combined with said ethylene containing polymer.

19. The composition of claim 18, wherein the ethylene containing polymer comprises an ethylene-propylene copolymer or an ethylene-propylene terpolymer.

20. The composition of claim 19, wherein the ethylene containing polymer is ethylene propylene diene monomer (EPDM).

21. The composition of claim 18, wherein the chemical compound comprises: a fatty alcohol ethoxylate, a fatty acid ethoxylate, a fatty amine ethoxylate, a fatty amide ethoxylate, a glycerol or a sorbitan ester ethoxylate.

22. The composition of claim 18, wherein the carbon black is present in an amount of from 115 to 175 parts by weight based on 100 parts by weight of said ethylene containing polymer.

23. The composition of claim 18, further comprising: a coagent, a processing additive, a hydrocarbon oil, a stabilizer, an accelerator, an antioxidant, vinyl silane, a curing agent, or mixtures thereof.

* * * * *